(12) United States Patent
Tarighat-Mehrabani et al.

(10) Patent No.: US 7,924,802 B2
(45) Date of Patent: Apr. 12, 2011

(54) WIRELESS COMMUNICATION SYSTEMS AND METHODS

(75) Inventors: Alireza Tarighat-Mehrabani, Marina Del Rey, CA (US); Rahim Bagheri, Los Angeles, CA (US); Alireza Mehrnia, Los Angeles, CA (US); Mahmoud Darvishzadeh, Los Altos Hills, CA (US)

(73) Assignee: WiLinx Corporation, Carlsbad, CA (US)

( * ) Notice: Subject to any disclaimer, the term of this patent is extended or adjusted under 35 U.S.C. 154(b) by 718 days.

(21) Appl. No.: 12/018,370

(22) Filed: Jan. 23, 2008

(65) Prior Publication Data

US 2009/0185545 A1   Jul. 23, 2009

(51) Int. Cl.
*H04J 1/00* (2006.01)
*H04B 7/00* (2006.01)
*H04Q 7/20* (2006.01)

(52) U.S. Cl. ... 370/343; 370/352; 375/295; 348/E7.052; 455/93

(58) Field of Classification Search ................. 370/308, 370/310, 343, 352, 353–356, 480–486; 375/135–297, 372, 347, E7.267; 455/93, 455/127.1, 102, 132, 313–341; 341/155; 348/E7.052, E7.094

See application file for complete search history.

(56) References Cited

U.S. PATENT DOCUMENTS

| | | | | |
|---|---|---|---|---|
| 5,832,044 A * | 11/1998 | Sousa et al. | | 375/347 |
| 5,884,181 A * | 3/1999 | Arnold et al. | | 455/450 |
| 6,920,185 B2 * | 7/2005 | Hinson | | 375/295 |
| 7,515,652 B2 * | 4/2009 | Jensen | | 375/308 |
| 7,805,119 B2 * | 9/2010 | Gur et al. | | 455/205 |
| 2003/0016701 A1 * | 1/2003 | Hinson | | 370/480 |
| 2003/0020651 A1 * | 1/2003 | Crilly et al. | | 342/378 |
| 2008/0139132 A1 * | 6/2008 | Pan et al. | | 455/93 |
| 2008/0225761 A1 * | 9/2008 | Zhang | | 370/310 |
| 2008/0227424 A1 * | 9/2008 | Muhammad et al. | | 455/341 |

* cited by examiner

*Primary Examiner* — Afsar M. Qureshi

(57) ABSTRACT

Embodiments of the present invention transmit signals simultaneously over a communication channel at different RF center frequencies, and may use a single power amplifier and antenna. In one embodiment the present invention includes a method of transmitting information in a wireless communication channel comprising receiving digital signals having data to be transmitted, converting the signals to analog signals, up-converting each analog signal, combining the up-converted signals, amplifying the combined up-converted signal and transmitting the combined up-converted signal. In one embodiment, the same data is sent over a transmission channel at two different frequencies to improve reliability.

25 Claims, 12 Drawing Sheets

WIRELESS COMMUNICATION SYSTEMS AND METHODS

BACKGROUND

The present invention relates to wireless electronics, and in particular, to wireless communication systems and methods.

Unless otherwise indicated herein, the approaches described in this section are not prior art to the claims in this application and are not admitted to be prior art by inclusion in this section.

Communication systems generally contain one or more transmission channels to transmit data from the transmitter to the receiver. The components included in a transmitter and receiver may vary depending on the attributes of the communication channel, the signaling, and the goals of the transmission channel. FIG. 1 illustrates an example of a transmitter 100 used in a wireless communication system. Here, a digital-to-analog converter ("DAC") 110 receives a digital input signal ("IN"). The DAC converts a digital signal to an analog signal. This may be necessary in communication systems that take advantage of digital signal processing. The DAC is coupled to the input of filter 120. The filter may be used to remove undesirable frequencies and signal images. The filter is then coupled to mixer 130. The mixer may be used to up-convert the frequency of the signal by combining it with a local oscillator signal ("LO"). The output of the mixer is coupled to power amplifier 140 to amplify the signal for transmission before it is sent through antenna 150. The transmitter 100 is limited to up-converting a signal to one center frequency (or modulation frequency), which is the LO frequency. Typically, the amount of information transmitted around the center frequency is limited by the bandwidth of the transmitter around the center frequency. Accordingly, this limits the amount of data that can be transmitted. Typical prior art approaches to improving the information capacity in a wireless communication system involve maximizing the bandwidth around the center frequency to increase the amount of information that may be modulated onto the carrier frequency.

Another limitation to wireless communication involves allowable output power. In many countries, regional authorities will limit the amount of power that may be transmitted at any given frequency or across a range of frequencies. In other words, when a transmitter transmits a signal at a particular center frequency, the transmitter may be required to output less than a specified upper limit of power per Megahertz. This limitation may limit the reliability, the range, and the effective throughput of data transmission. Transmission range, reliability, throughput, complexity, and cost all play a role in enabling new wireless applications. Since there is a continuing need for new wireless devices, these and other issues, concerning the transmission and reception of radio frequency (RF) signals, become important. Thus, there is a need for improvements in wireless communication systems and methods.

SUMMARY

Embodiments of the present invention improve wireless communication systems and methods. In one embodiment, the present invention includes a method of transmitting information in a wireless communication channel comprising transmitting first information across a first frequency range using a wireless transmitter, the first frequency range having a first center frequency, a first highest frequency, and a first lowest frequency, and simultaneously transmitting second information across a second frequency range using the same wireless transmitter, the second frequency range having a second center frequency greater than the first center frequency, a second highest frequency, and a second lowest frequency.

In one embodiment, the frequency difference between the first center frequency and the second center frequency is greater than the sum of one-half the first frequency range and one-half the second frequency range.

In one embodiment, the first and second information are transmitted using the same power amplifier in said wireless transmitter.

In one embodiment, the bandwidth of said power amplifier is greater than the difference between the first lowest frequency and the second highest frequency.

In one embodiment, first information and second information comprise a plurality of OFDM symbols, wherein a first symbol is transmitted during a first time slot across the first frequency range and a second symbol is transmitted during the first time slot across the second frequency range, and wherein a third symbol is transmitted during a second time slot across the first frequency range and a fourth symbol is transmitted during the second time slot across a second frequency range.

In one embodiment, the present invention further comprises concurrently changing the first center frequency to a third center frequency and the second center frequency to a fourth center frequency, wherein the fourth center frequency is greater than the third center frequency, and wherein the first center frequency changes by at least the first frequency range and the second center frequency changes by at least the second frequency range, and wherein the bandwidth of said power amplifier is greater than the difference between the first lowest frequency and the second highest frequency for the changed first and second center frequencies.

In one embodiment, the first information corresponds to a first wireless protocol and the second information corresponds to a second wireless protocol.

In one embodiment, the first information and the second information are the same data transmitted across two different frequencies.

In one embodiment, the first information and the second information are produced from the same data stream using coding or data mapping.

In one embodiment, the present invention includes a method of transmitting information in a wireless communication channel comprising receiving a first digital signal comprising first data to be transmitted, receiving a second digital signal comprising second data to be transmitted, converting the first digital signal into a first analog signal using a first digital-to-analog converter, the first analog signal carrying the first data across a first frequency range, converting the second digital signal into a second analog signal using a second digital-to-analog converter, the second analog signal carrying the second data across a second frequency range, up-converting the first analog signal to a first RF center frequency to produce a first up-converted analog signal, wherein the first up-converted analog signal comprises a first up-converted frequency range from the first RF center frequency minus one-half the first frequency range to the first RF center frequency plus one-half the first frequency range, up-converting the second analog signal to a second RF center frequency greater than the first center RF frequency to produce a second up-converted analog signal, wherein the second up-converted analog signal comprises a second up-converted frequency range from the second RF center frequency minus one-half the second frequency range to the second RF center frequency plus one-half the second frequency range, and wherein a frequency difference between the first RF center frequency and the second RF center frequency is greater than the sum of one-half the first frequency range and one-half the second frequency range, combining the first up-converted analog signal and the second up-converted analog signal to produce a combined up-converted signal, amplifying the combined up-converted signal in a power amplifier resulting in an amplified combined up-converted signal, and transmitting the amplified combined up-converted signal on a first antenna, wherein the bandwidth of said power amplifier is greater than the difference between a lowest frequency in the first up-converted frequency range and a highest frequency in the second up-converted frequency range.

In one embodiment, the present invention further comprises changing the first and second RF center frequencies, and in accordance therewith, up-converting the first analog signals to the changed first and second RF center frequencies, wherein the first RF center frequency changes by at least the first frequency range and the second RF center frequency changes by at least the second frequency range.

In one embodiment, the first and second RF center frequencies are changed concurrently.

In one embodiment, the first digital signal is encoded using a first wireless protocol and the second digital signal is encoded using a second wireless protocol.

In one embodiment, the second data is the same as the first data, the present invention further comprises receiving the transmitted signal on a second antenna, amplifying the received signal in a low noise amplifier resulting in an amplified received up-converted signal, wherein the bandwidth of said low noise amplifier is greater than the difference between the lowest frequency in the first up-converted frequency range and the highest frequency in the second up-converted frequency range, down-converting the amplified received up-converted signal using a first down-converter and a signal corresponding to the first RF center frequency to produce a fourth analog signal corresponding to the first analog signal, and down-converting the amplified received up-converted analog signal using a second down-converter and a signal corresponding to the second RF center frequency to produce a fifth analog signal corresponding to the second analog signal.

In one embodiment, the present invention further comprises filtering the fourth analog signal using a third filter and filtering the fifth analog signal using a fourth filter, converting the filtered fourth analog signal into a third digital signal using a first analog-to-digital converter and converting the filtered fifth analog signal into a fourth digital signal using a second analog-to-digital converter, and combining the third and fourth digital signals to receive data corresponding to the first data.

In one embodiment, the present invention further comprises combining the fourth and fifth analog signals resulting in a sixth signal, and converting the sixth signal into a third digital signal using a first analog-to-digital converter, and in accordance therewith, receiving data corresponding to the first data.

In one embodiment, the present invention includes a wireless communication system comprising a baseband digital system for providing a first digital signal comprising a first data to be transmitted and a second digital signal comprising a second data to be transmitted, a first digital-to-analog converter for receiving the first digital signal and converting the first digital signal into a first analog signal, the first analog signal carrying the first data across a first frequency range, a second digital-to-analog converter for receiving the second digital signal and converting the second digital signal into a second analog signal, the second analog signal carrying the second data across a second frequency range, a first up-converter circuit having a first input coupled to receive the first analog signal and a second input coupled to receive a first modulation signal having a first RF frequency, wherein the first up-converter outputs a first up-converted analog signal comprising a first up-converted frequency range from the first RF frequency minus one-half the first frequency range to the first RF frequency plus one-half the first frequency range, a second up-converter circuit having a first input coupled to receive the second analog signal and a second input coupled to receive a second modulation signal having a second RF frequency, wherein the second up-converter outputs a second up-converted analog signal comprising a second up-converted frequency range from the second RF frequency minus one-half the second frequency range to the second RF frequency plus one-half the second frequency range, and wherein frequency difference between the first RF frequency and the second RF frequency is greater than the sum of one-half the first frequency range and one-half the second frequency range, and a power amplifier coupled to receive the first and second up-converted analog signals, wherein the bandwidth of the power amplifier is greater than the difference between a lowest frequency in the first up-converted frequency range and a highest frequency in the second up-converted frequency range.

In one embodiment, the first RF frequency and the second RF frequency change within the bandwidth of the power amplifier.

In one embodiment, the first RF frequency and the second RF frequency change concurrently.

In one embodiment, the first RF frequency and the second RF frequency change periodically.

In one embodiment, the first data of the first digital signal is encoded using a first wireless protocol and the first data of the second digital signal is encoded using a second wireless protocol.

In one embodiment, the second data corresponds to the first data, and wherein the power amplifier outputs a third up-converted signal comprising the up-converted first analog signal and the up-converted second analog signal.

In one embodiment, the first and second data to be transmitted comprise a plurality of OFDM symbols, wherein a first symbol is transmitted during a first time slot across the first up-converted frequency range and a second symbol is transmitted during the first time slot across the second up-converted frequency range, and wherein a third symbol is transmitted during a second time slot across the first up-converted frequency range and a fourth symbol is transmitted during the second time slot across a second up-converted frequency range.

In another embodiment, the present invention includes an electronic circuit comprising a first down-converter circuit having a first input coupled to receive a first up-converted signal, a second input coupled to receive a first demodulation signal having a first RF frequency, and an output, wherein the first down-converter circuit outputs a first down-converted signal on the first down-converter output, a second down-converter circuit having a first input coupled to receive the first up-converted signal, a second input coupled to receive a second demodulation signal having a second RF frequency different than the first RF frequency, and an output, wherein the second down-converter outputs a second down-converted signal on the second down-converter output, wherein the first up-converted signal comprises a first signal modulated at the first RF frequency and a second signal modulated at the second RF frequency, and a filter having an input coupled to the output of the first down-converter and the output of the second down-converter, and in accordance therewith, the filter receives the first and second down-converted signals.

In one embodiment, first signal has a first frequency range and the second signal has a second frequency range, and wherein the frequency difference between the first RF frequency and the second RF frequency is greater than the sum of one-half the first frequency range and one-half the second frequency range.

The following detailed description and accompanying drawings provide a better understanding of the nature and advantages of the present invention.

DETAILED DESCRIPTION

Described herein are techniques for wireless communication systems and methods. In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

Figure 1:
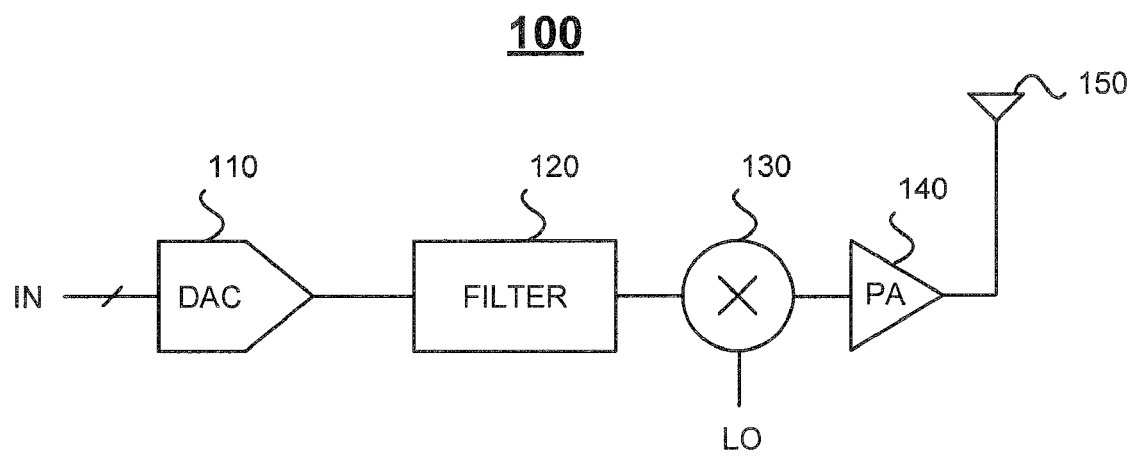
FIG. 1 illustrates a segment of a transmitter in a wireless communication system.
Figure 2:
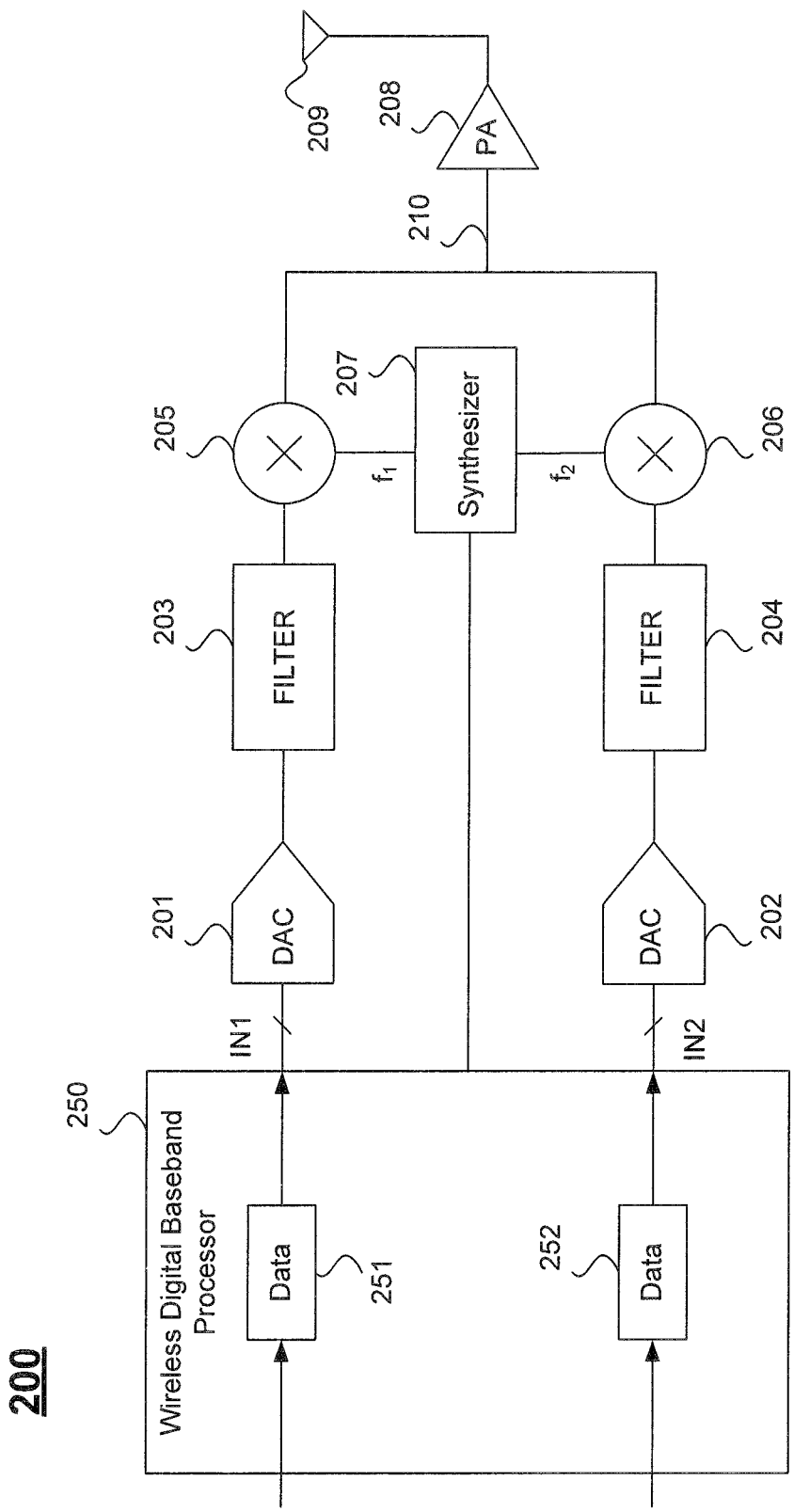
FIG. 2 illustrates a wireless communication system according to one embodiment of the present invention.
Figure 3:
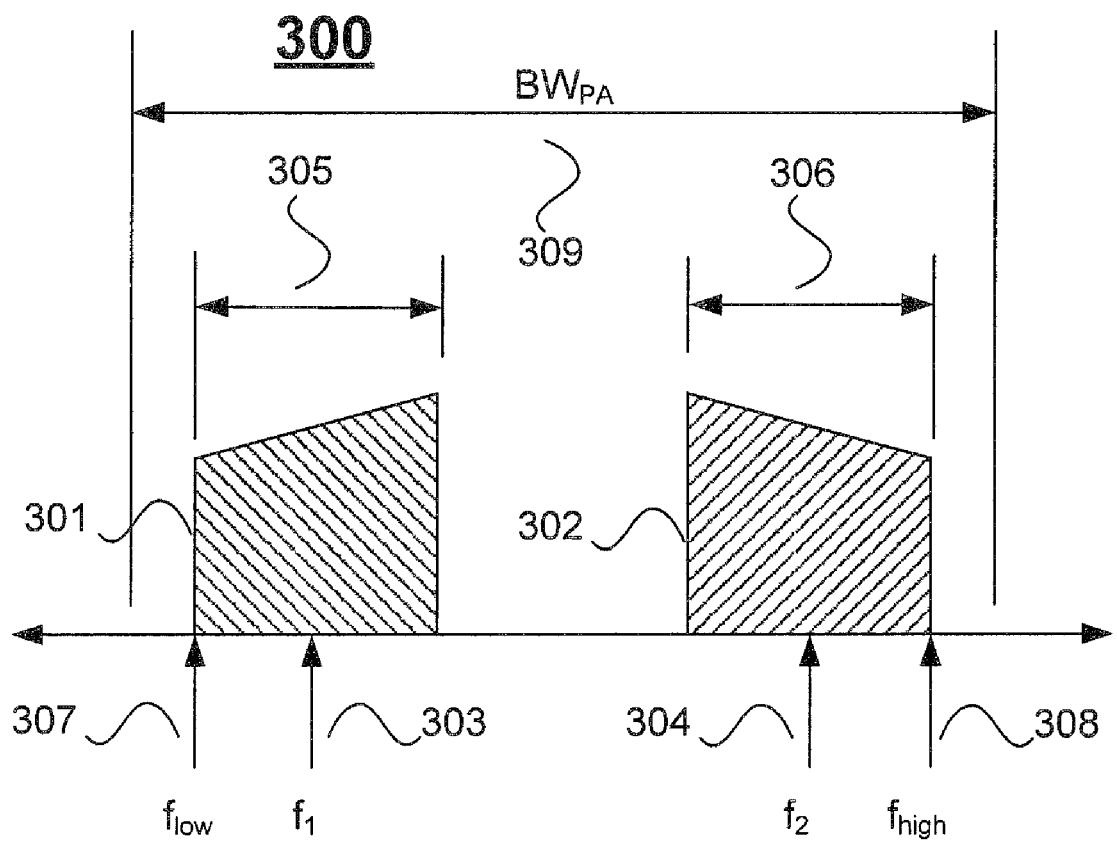
FIG. 3 illustrates an example transmitted signal according to one embodiment of the present invention.

FIG. 2 illustrates a wireless communication system according to one embodiment of the present invention. System 200 includes digital-to-analog converter (DAC) 201, DAC 202, filter 203, filter 204, up-converter 205 (such as a mixer), up-converter 206, synthesizer 207, power amplifier 208, and antenna 209. FIG. 3 illustrates an example of the frequency content of the transmitted signal 300 which may result from system 200. Information (i.e., data) to be transmitted may be received in a baseband digital system 250, such as a wireless digital baseband processor. The baseband digital system 250 provides a first digital signal that comprises first digital data 251 to be transmitted to "IN1" and provides a second digital signal that comprises second digital data 252 to be transmitted to "IN2". The data 252 and data 252 may be packets of data that conform to a specific wireless communication protocol, for example. Baseband digital system 250 may deserialize a data stream (e.g., using a demultiplexing function) to divide data packets between the two transmitter channels, for example. As another example, the original information data may be passed through an encoder and the output of the encoder would be split into two streams providing inputs 251 and 252. The data of the first digital signal and the data of the second digital may be unrelated data steams or may be data from the same data stream, for example.

In this example, the input of DAC 201 is coupled to a first data output of the baseband processor 250, and the first digital signal is converted to a first analog signal by DAC 201. Similarly, the input of DAC 202 is coupled to a second data output of baseband processor 250, and the second digital signal is converted to a second analog signal by DAC 202. The output of DAC 201 is coupled to the input of filter 203, and the first analog signal is filtered by filter 203 to remove unwanted frequency content (e.g., remove aliasing). Similarly, the output of DAC 202 is coupled to the input of filter 204, and the second analog signal is filtered by filter 204 to remove unwanted frequency content.

A first input of up-converter 205 is coupled to the output of filter 203 to receive the first analog signal and a second input of up-converter 205 is coupled to synthesizer 207 to receive a first modulation signal having a first RF center frequency 303 ($f_1$) as shown in FIG. 3. Accordingly, the first analog signal is up-converted around a center frequency of $f_1$ by up-converter 205 to generate a first up-converted analog signal 301. The first up-converted analog signal 301 includes a first up-converted frequency range 305. It can be seen from FIG. 3 that the first up-converted frequency range is from the first RF frequency 303 minus one-half the first up-converted frequency range to the first RF frequency plus the one-half the first up-converted frequency range.

Similarly, a first input of up-converter 206 is coupled to the output of filter 204 to receive the second analog signal and a second input of up-converter 206 is coupled to synthesizer 207 to receive a second modulation signal having a second RF center frequency 304 ($f_2$) as shown in FIG. 3. Accordingly, the second analog signal is up-converted around a center frequency of $f_2$ by up-converter 206 to generate a second up-converted analog signal 302. The second up-converted analog signal 302 includes a second up-converted frequency range 306. It can be seen from FIG. 3 that the second up-converted frequency range is from the second RF frequency 304 minus one-half the second up-converted frequency range to the second RF frequency plus the one-half the second up-converted frequency range. Additionally, FIG. 3 illustrates that a frequency difference between the first RF center frequency and the second RF center frequency is greater than the sum of one-half the first frequency range and one-half the second frequency range so that the up-converted signals do not overlap and thereby cause distortion. In general, either two synthesizers can be used to generate f1 and f2, or a single synthesizer with the capability of producing f1 and f2 simultaneously.

A power amplifier 208 (PA) is coupled to receive the first and second up-converted analog signals 301 and 302. The first and second up-converted signals may be simply added together at the input of PA. Embodiments of the present invention transmit multiple signals simultaneously over a communication channel at different center frequencies, and may use a single power amplifier and antenna. In another embodiment, two or more power amplifiers may be used as part of the power amplifier implementation. In this example, the bandwidth 309 ($BW_{PA}$) of the PA 208 is greater than the difference between a lowest frequency 307 ($f_{low}$) in the first up-converted frequency range 305 and highest frequency 308 ($f_{high}$) in the second up-converted frequency range 306. The input of amplifier 208 is coupled to the outputs of up-converters 205 and 206. Accordingly, the first and second up-converted analog signals are combined at the input of amplifier 208 before amplification to produce a combined up-converted signal. The amplifier 208 outputs an amplified up-converted signal comprising the first up-converted analog signal and the second up-converted analog signal. The antenna 209 is coupled to the output of amplifier 208 to transmit the amplified ups converted signal as an electromagnetic signal. When the bandwidth 309 of PA 208 covers a wide bandwidth, many up-converted signals may be transmitted using the single power amplifier 208 and a single antenna 209. Since only a single antenna is utilized, the application may not require multiple power amplifiers and antennas, which reduces area and cost while increasing data throughput or, as illustrated below, reliability.

Figure 4:
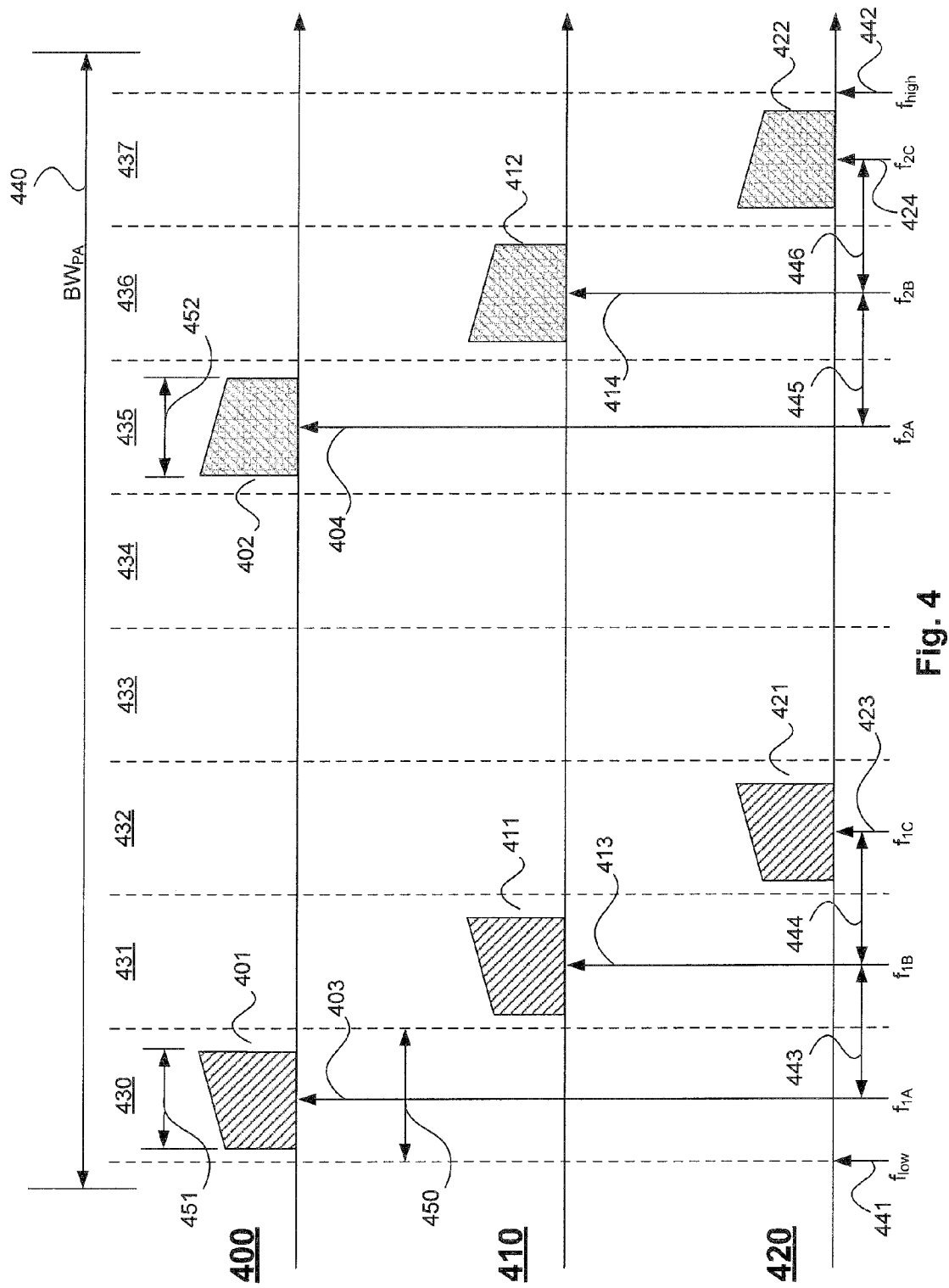
FIG. 4 illustrates an example of wireless communication according to one embodiment of the present invention.

FIG. 4 illustrates an example of how the frequency content can move within a bandwidth according to one embodiment of the present invention. Communication system 200 may generate frequency content 400 comprising the first up-converted analog signal 401 and the second up-converted analog signal 402. The synthesizer 207 may receive instructions from the baseband processor 250, for example, to change the first RF center frequency 403 ($f_{1A}$) and second frequency RF center frequency 404 ($f_{2A}$) within a bandwidth 440 ($BW_{PA}$). The change in frequency may occur concurrently, for example. This may result in a new frequency content 410 in which the signal 401 has moved in frequency as illustrated by signal 411 having an RF center frequency 413 ($f_{1B}$), and the signal 402 has moved in frequency as illustrated by signal 412 having an RF center frequency 414 ($f_{2B}$). Some time later the RF frequencies can change again. This may result in a new frequency content 420 in which the signal 411 has changed to 421 with fifth RF frequency 423 ($f_{1C}$) and the signal 412 has changed to signal 422 with sixth RF frequency 424 ($f_{2C}$). Some time later the RF frequencies may change again. In this example, another change may return the RF signals to the original locations in frequency illustrated in frequency content 400. This cycle may repeat itself again or begin a different cycle. Different implementations may change the RF center frequencies between a variety of locations. For example, the changes may move the RF signals to adjacent or non-adjacent locations, or the signal 401 may be moved to higher frequencies than signal 401. Additionally, the changes in RF frequency can happen at irregular intervals or at regular intervals (periodically). As illustrated in FIG. 2, synthesizer 207 may be coupled to baseband processor 250 for controlling the frequencies generated at each synthesizer output. For example, synthesizer 207 may be programmed or otherwise configured to generate modulation signals with RF frequencies illustrated in FIGS. 3 and 4. Synthesizer 207 may then be reprogrammed or otherwise reconfigured to change the RF frequencies as described above. Furthermore, the spacing between the two RF center frequencies may remain the same or may vary. One or more data streams from the same or different sources may be transmitted using a single power amplifier wherein the bandwidth of said power amplifier is greater than the difference between a lowest frequency in the first up-converted frequency range ($f_{low}$) and a highest frequency in the second up-converted frequency range ($f_{high}$).

Another embodiment of the invention may utilize a first wireless protocol to encode the first digital data and utilize a second wireless protocol to encode the second digital data. Almost any existing protocol may be used as the first protocol or second protocol. An ultra-wideband (UWB) protocol such as WiMedia, wireless local area network (WLAN) protocol such as 802.11.g, or cellular standard may be used. A Orthogonal frequency domain multiplexing (OFDM) or a code division multiple access CDMA modulation may be used, for example.

Figure 5:
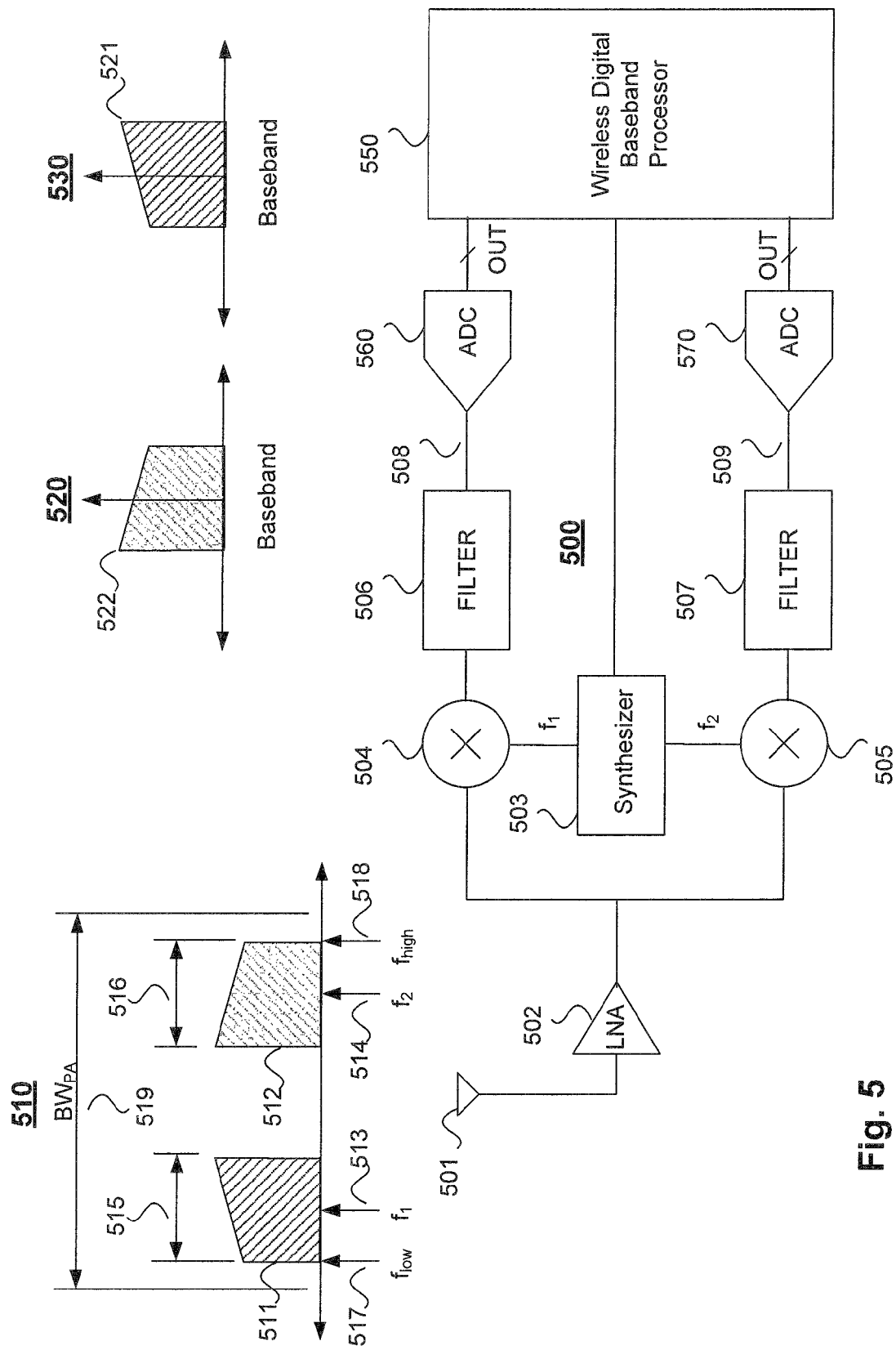
FIG. 5 illustrates a wireless communication system according to another embodiment of the present invention.

FIG. 5 illustrates a wireless communication system according to another embodiment of the present invention. System 500 includes an antenna 501, low noise amplifier 502 (LNA), a down-converter 504, a down-converter 505, a synthesizer 503, filters 506 and 507, and analog-to-digital converters (ADC) 560 and 570. Frequency content 510 may be transmitted as the first electromagnetic signal described above and received by antenna 501. The electromagnetic signal received by antenna 501 may include an up-converted analog signal from a transmitter as described above including signals 511 and 512. As mentioned above, the signals 511 and 512 carry different data from a common data stream or from different data streams, data corresponding to different protocols, or even the same data. Signal 511 may be an analog signal up-converted to a first RF center frequency, and signal 512 may an analog signal up-converted to a second RF center frequency. A low noise amplifier 502 has an input coupled to antenna 501 to receive the up-converted RF signals, and outputs an amplified up-converted signal. In a differential system the output of the LNA may be two signal lines (i.e., a differential signal), for example. A first down-converter 504 includes a first input that is coupled to the output of LNA 502 to receive the amplified RF signal. The first down-converter 504 includes a second input coupled to receive a signal corresponding to the first RF center frequency (i.e., a demodulation signal having a frequency such as f1) from synthesizer 503. The first down-converter 504 outputs a first down-converted analog signal. The first down-converted analog signal corresponds to the analog signal carrying information across frequency range 515, which was provided to an up-converter in the transmitter that generated signal 510. A second down-converter 505 includes an input that is coupled to the output of LNA 502 to receive the amplified up-converted signal. The second down-converter 505 includes an input that is coupled to a signal corresponding to the second RF frequency (f2) from synthesizer 503. The second down-converter 505 outputs a second down-converted analog signal. The second down-converted analog signal from down-converter 505 corresponds to an analog signal carrying information across frequency range 516, which was provided to an up-converter in the transmitter that generated signal 510. The output of down-converter 504 is coupled to the input of filter 506 to receive the first down-converted analog signal. Similarly, the output of down-converter 505 is coupled to the input of filter 507 to receive the second down-converted analog signal. The filters eliminate frequency content outside the frequency band of interest. As illustrated by 520 and 530, signals 515 and 516 are down-converted to baseband and filtered, so that each signal may be processed on separate receiver input channels (e.g., filters, ADCs, and digital processing circuits in baseband processor 550). While the above examples illustrate transmission and reception using direct up and down conversion to and from RF center frequencies, it is to be understood that in other implementations the signals could be up/down-converted to intermediate frequencies in intermediate steps between baseband processing. The filtered signals 522 and 521 may be found at locations 508 and 509, and are illustrated in graphs 520 and 530. Analog-to-digital converter 560 is coupled to the output of filter 506 to receive the first down-converted signal 522 and convert signal 522 to back into a digital signal. Similarly, analog-to-digital converter 570 is coupled to the output of filter 507 to receive the second down-converted signal 521 and convert signal 521 to back into a digital signal. The digital signals may be processed to retrieve the original data. For example, the digital signals may be serialized back into a single data stream (e.g., using a MUX), processed independently according to different protocol requirements, or, if the data is the same data, combined digitally to improve the reliability of the transmission, for example.

Figure 6:
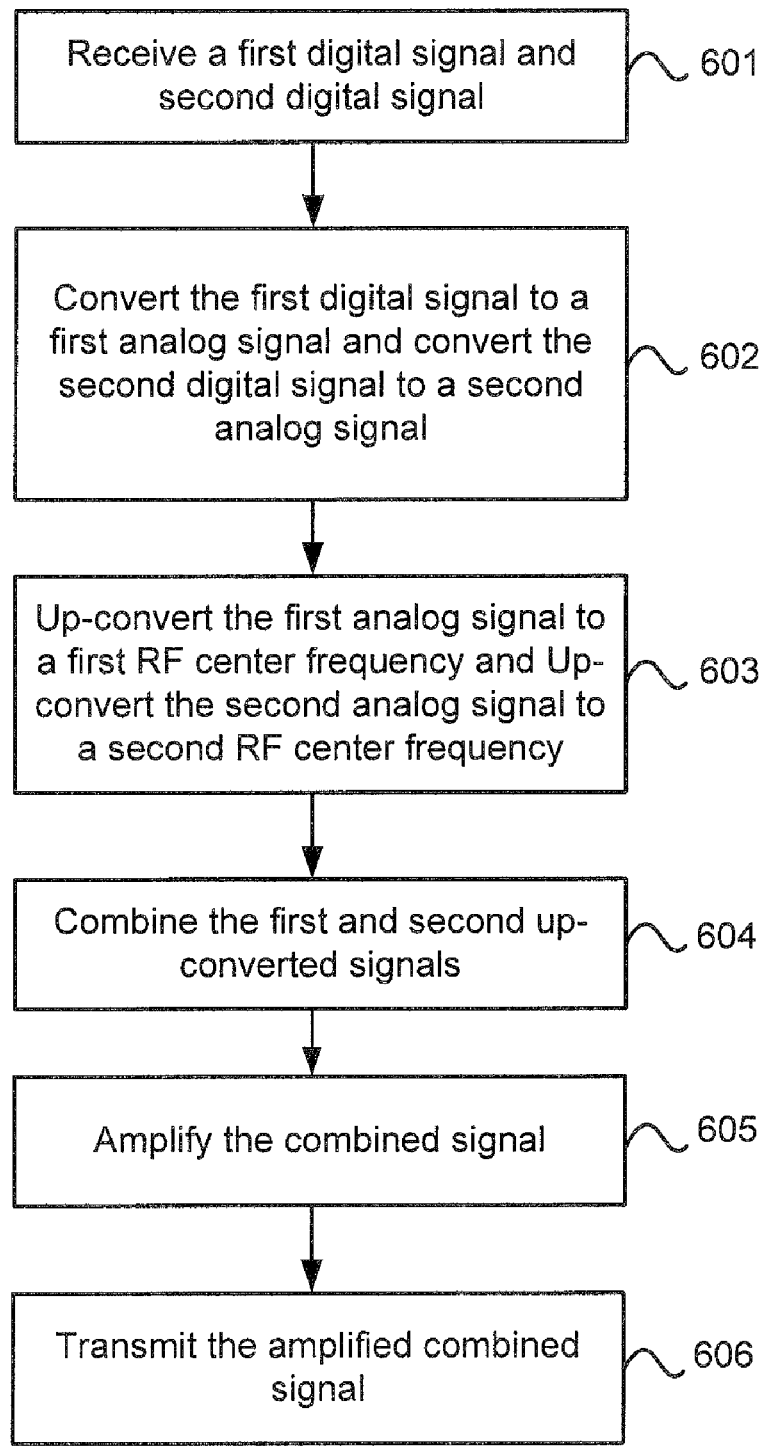
FIG. 6 illustrates a wireless communication method according to one embodiment of the present invention.

FIG. 6 illustrates a wireless communication method 600 according to one embodiment of the present invention. At 601, a first digital signal, including a first data, is received, and a second digital signal, including a second data, is received. The data may be received from a baseband processor in a wireless transmitter, for example, for up-conversion and transmission as an electromagnetic signal. In one embodiment, the first data may be unrelated to the second data. However, in other embodiments, the first data may correspond to the second data. For example, the same data may be encoded and divided into two streams and up-converted to two different RF center frequencies and then transmitted as described above. At 602, the first digital signal is converted to a first analog signal using a first digital-to-analog converter, for example. The first analog signal carries the first data across a first frequency range. Also at 602, the second digital signal is converted to a second analog signal using a second digital-to-analog converter, for example. The second analog signal carries the second data across a second frequency range. In one embodiment described in more detail below, the first and second analog signals are carrying different coded versions of the same digital data. At 603, the first analog signal is up-converted to a first RF center frequency. The up-converted first analog signal comprises a first up-converted frequency range from the first RF center frequency minus one-half the first frequency range to the first RF center frequency plus one-half the first frequency range. Also at 603, the second analog signal is up-converted to a second RF center frequency. The up-converted second analog signal comprises a second up-converted frequency range from the second RF center frequency minus one-half the second frequency range to the second RF center frequency plus one-half the second frequency range. The frequency difference between the first RF center frequency and the second RF center frequency may be greater than the sum one-half the first frequency range and one half the second frequency range. Accordingly, the frequency content of the up-converted signals will not overlap. At 604, the first up-converted analog signal and the second up-converted analog signal are combined into a combined up-converted signal. At 605, the combined up-converted signal is amplified (e.g., in a power amplifier) and results in an amplified combined up-converted signal. In one embodiment, the bandwidth of the power amplifier is greater than the difference, in frequency, between a lowest frequency in the first up-converted frequency range and a highest frequency in the second up-converted frequency range. At, 606 the amplified signal is transmitted, for example, by coupling the output of the power amplifier to an antenna.

Figure 7A:
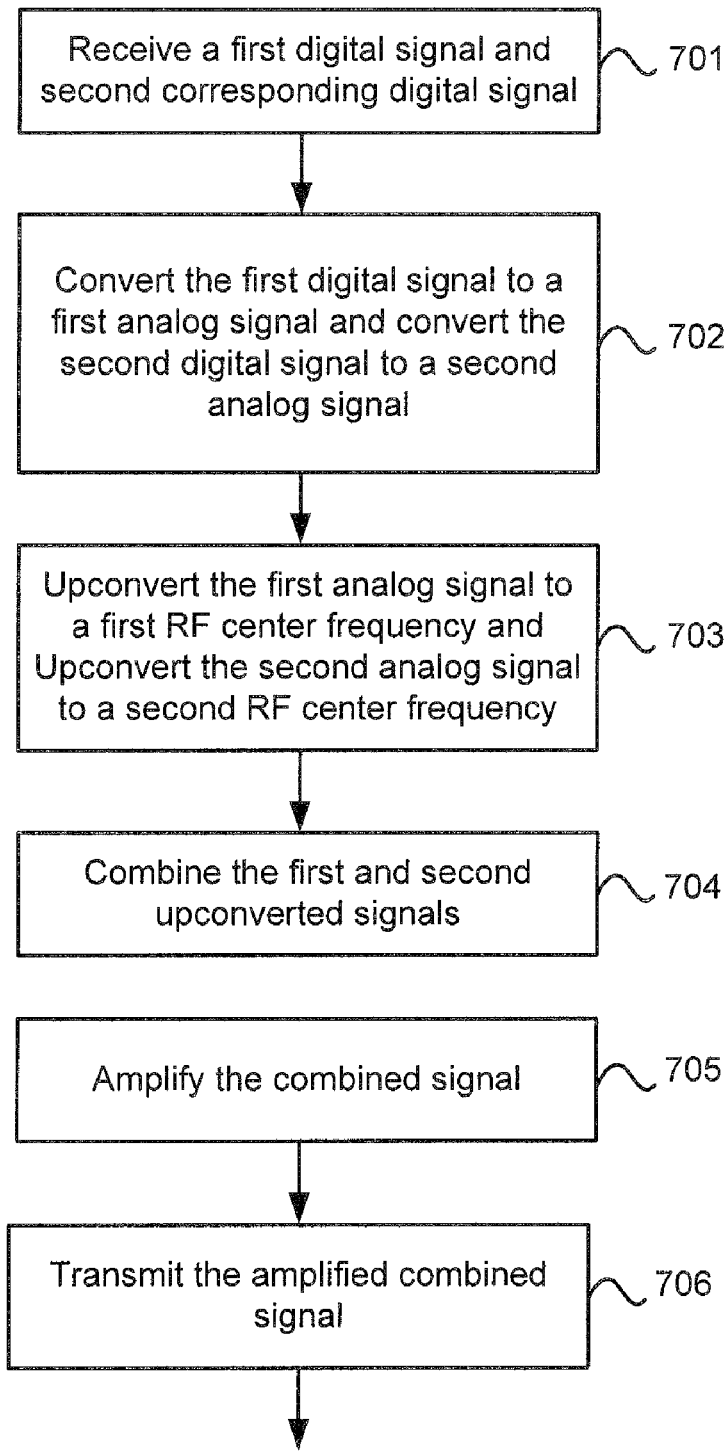
FIGS. 7A and 7B illustrate a wireless communication method according to another embodiment of the present invention.
Figure 7B:
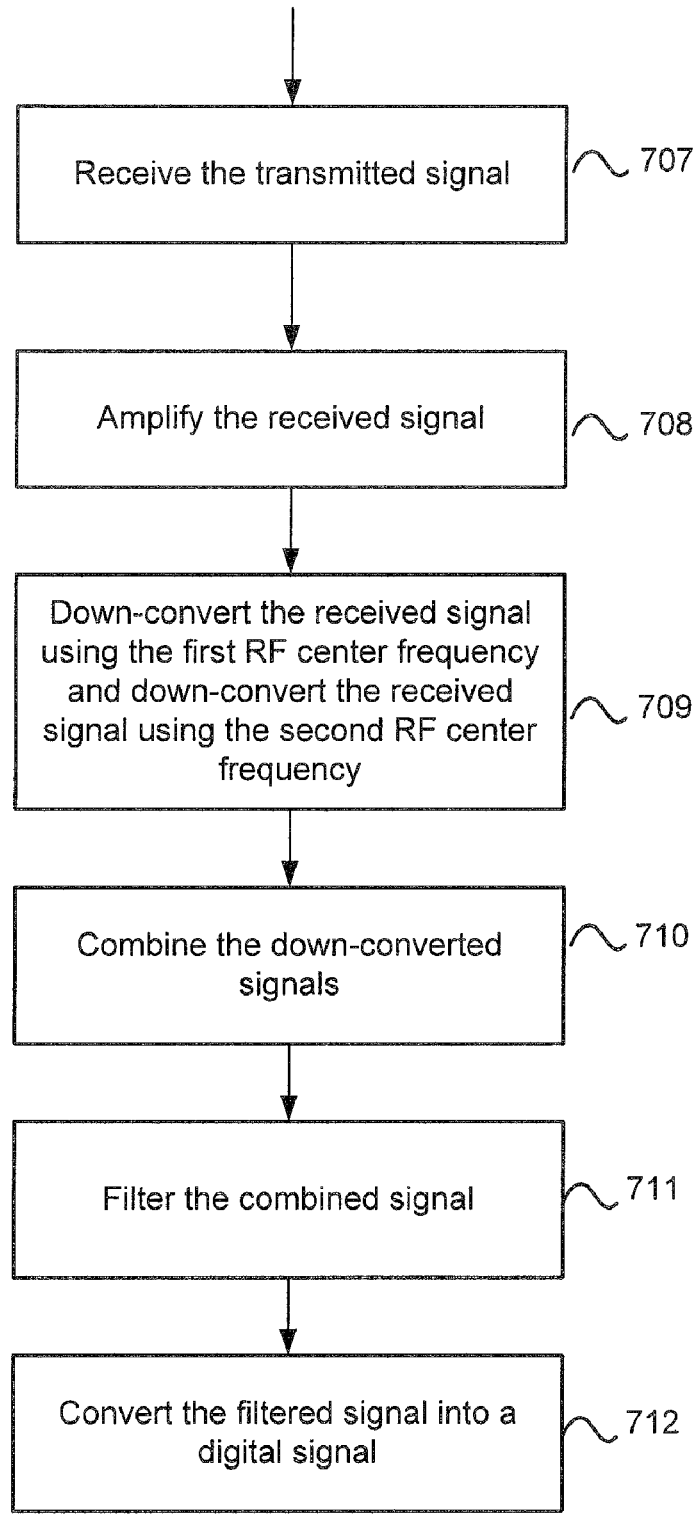

FIGS. 7A and 7B illustrate a wireless communication method 700 according to another embodiment of the present invention. At 701, a first digital signal, including a first data, is received and a second digital signal, including a second data, is received. In this example, the first and second data include different coded versions of the same data. For example, as mentioned above, one embodiment of the invention may include transmitting the same data at two different RF frequencies and receiving and combining the data. This may be done so that the transmission of the data is more reliable (e.g., fewer errors). Also, using this method may allow for greater transmission range. This method may make the signal data more impervious to noise and interference. At 702, the first digital signal is converted to first analog signal using a first digital-to-analog converter. The first analog signal carries the first data across a first frequency range. Also at 702, the second digital signal is converted to a second analog signal using a second digital-to-analog converter. The second analog signal carries the second data across a second frequency range. At 703, the first analog signal is up-converted to a first RF center frequency. The up-converted first analog signal comprises a first up-converted frequency range from the first RF center frequency minus one-half the first frequency range to the first RF center frequency plus one-half the first frequency range. Also at 703, the second analog signal is up-converted to a second RF center frequency. The up-converted second analog signal comprises a second up-converted frequency range from the second RF center frequency minus one-half the second frequency range to the second RF center frequency plus one-half the second frequency range. The frequency difference between the first RF center frequency and the second RF center frequency is greater than the sum one-half the first frequency range and one half the second frequency range. At 704, the first up-converted analog signal and the second up-converted analog signal are combined into a combined up-converted signal. At 705, the combined up-converted signal is amplified in a power amplifier and results in an amplified combined up-converted signal. The bandwidth of the power amplifier is greater than the distance between a lowest frequency in the first up-converted frequency range and a highest frequency in the second up-converted frequency range. At, 706 the amplified combined up-converted signal is transmitted on a first antenna.

At 707, the transmitted signal is received on a second antenna of a receiver. At the receiver the two coded versions of the same data are processed and decoded properly to recover the original data. At 708, the received signal is amplified in a low noise amplifier and results in an amplified received up-converted signal. The bandwidth of the low noise amplifier is greater than the distance between a lowest frequency in the first up-converted frequency range and a highest frequency in the second up-converted frequency range. At 709, the amplified received up-converted signal is down-converted using a first down-converter and a signal corresponding to the first RF center frequency to produce a fourth analog signal corresponding to the first analog signal. Also at 709, the amplified received up-converted signal is down-converted using a second down-converter and a signal corresponding to the second RF center frequency to produce a fifth analog signal corresponding to the second analog signal. The received down-converted analog signals may be processed in separate analog receiver channels and combined digitally, as described above, or the fourth and the fifth analog signals may be combined into a sixth signal, as illustrated at 710. At 711, the combined signal is filtered. It is to be understood that filtering may occur before or after the received signals are combined. At 712, the combined signal is converted into a digital signal using an analog-to-digital converter. The resulting digital signal maybe processed digitally by a baseband processor and output first data.

Figure 8:
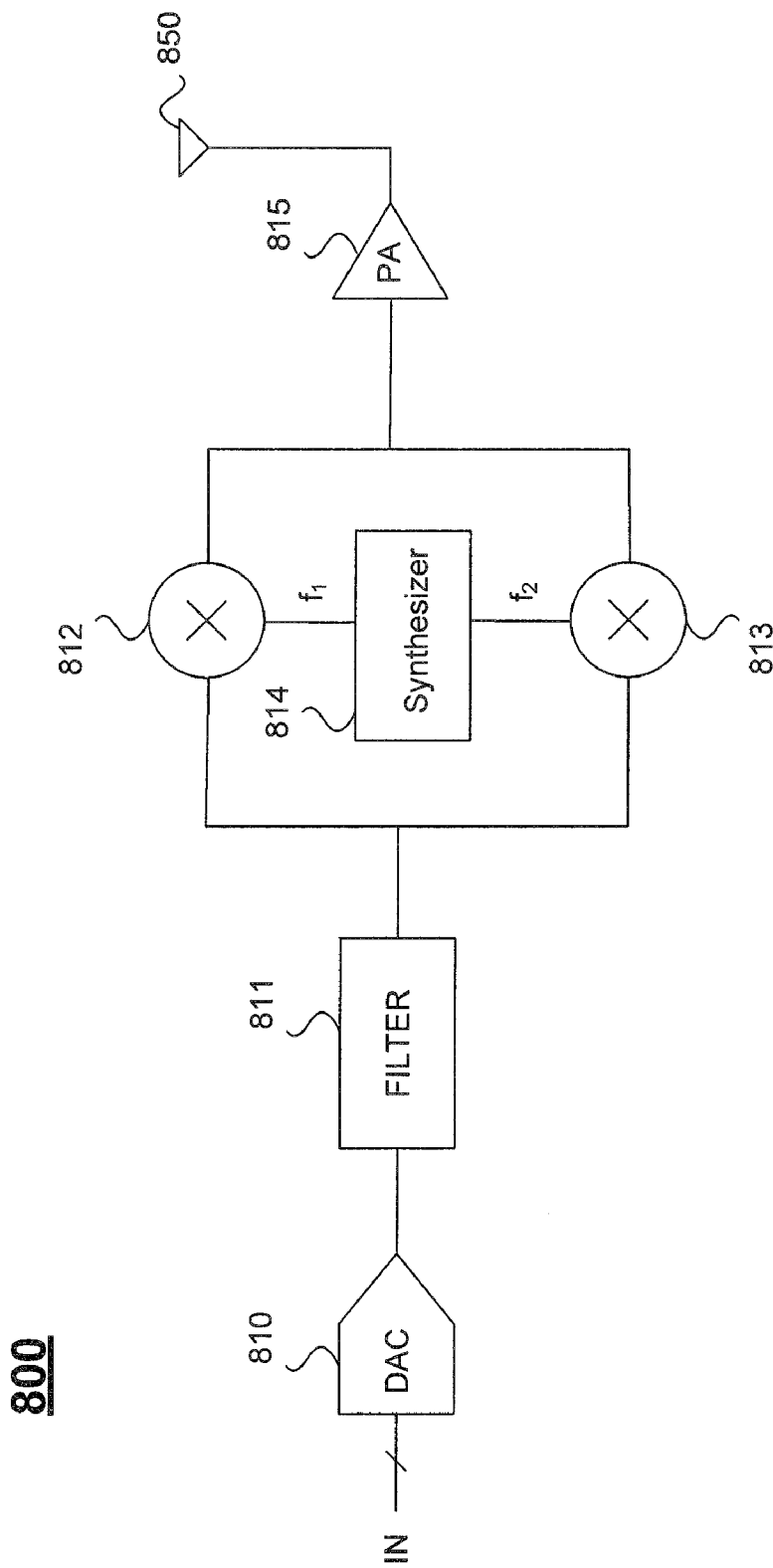
FIG. 8 illustrates a wireless communication transmitter according to one embodiment of the present invention.

FIG. 8 illustrates a wireless communication transmitter according to one embodiment of the present invention. This example provides a transmitter for sending the same data across a communication channel at two different RF carrier frequencies to improve reliability and/or increase the range of the system. A DAC 810 receives the data to be transmitted and converts the digital data into an analog signal. The output of the DAC 810 is coupled to the input of a filter 811 to filter unwanted frequency content, such as aliasing, for example. The output of filter 811 is coupled to the input of a first up-converter 812. Additionally, the output of filter 811 is coupled to the input of a second up-converter 813. Up-converter 812 includes a second input coupled to an output of a synthesizer 814, which may be used to up-convert the analog signal to a RF center frequency f1. Similarly, up-converter 813 includes a second input coupled to another output of a synthesizer 814 (or to a different synthesizer), which may be used to up-convert the analog signal to a RF center frequency f2. The outputs of up-converters 812 and 813 are coupled together and to the input of power amplifier 815. Accordingly, the up-converted signals are combined at the power amplifier input. Power amplifier 815 has a bandwidth sufficient to amplify all of the frequency content in the combined signal. The output of power amplifier 815 is coupled to antenna 850 to transmit the digital data simultaneously as an electromagnetic signal using two different RF carrier frequencies.

Figure 9:
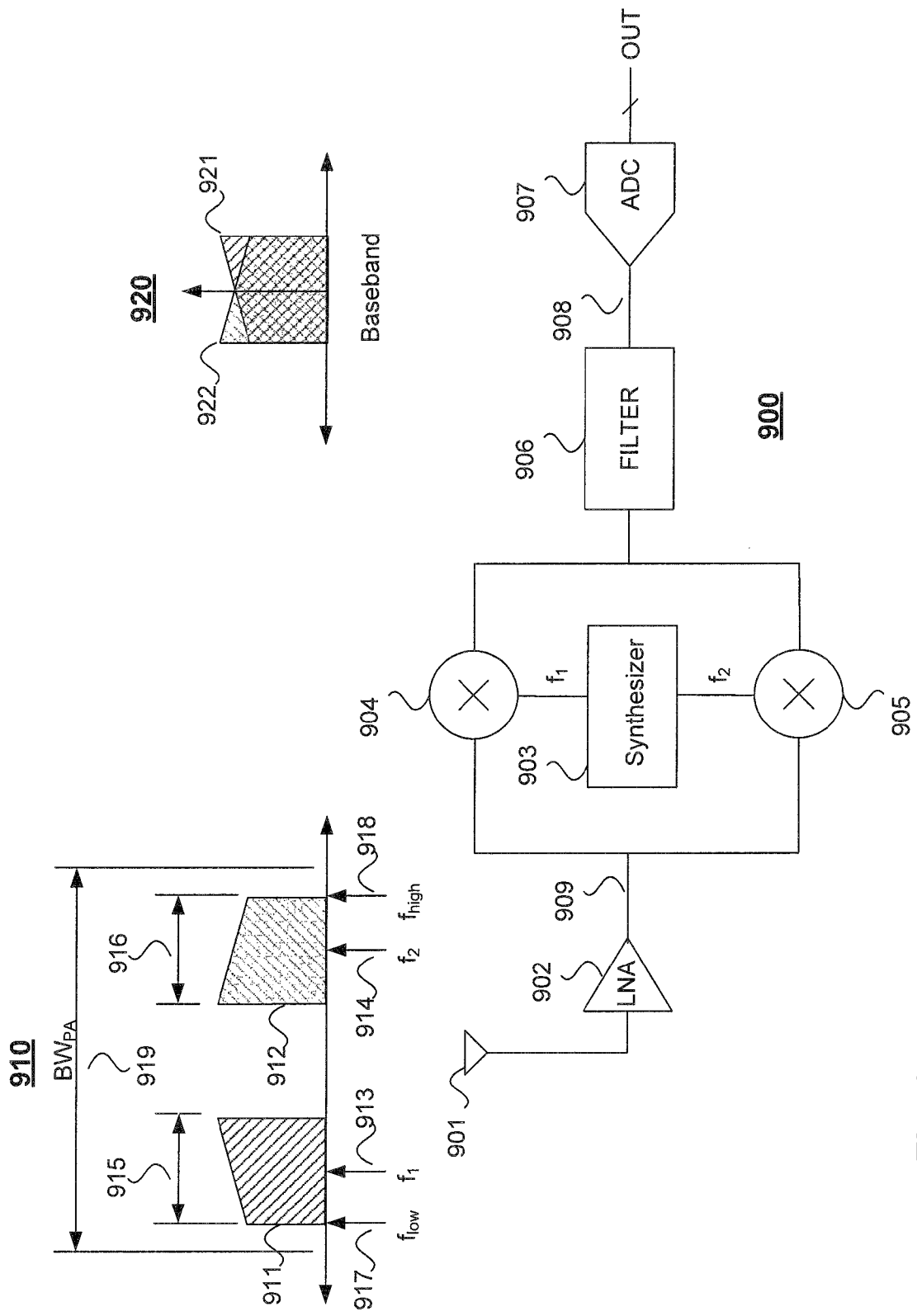
FIG. 9 illustrates a wireless communication receiver according to one embodiment of the present invention.

FIG. 9 illustrates a wireless communication receiver according to one embodiment of the present invention. System 900 includes an antenna 901, low noise amplifier 902 (LNA), a down-converter 404, a down-converter 905, a synthesizer 903, a filter 906, and an analog-to-digital converter (ADC) 907. Frequency content 910 may be transmitted as an electromagnetic signal described above and received by antenna 901. The electromagnetic signal received by antenna 901 may include an up-converted analog signal from transmitter 800, for example, including signals 911 and 912. In this example, the signals 911 and 912 carry the same information (data). For example, signal 911 may be an analog signal up-converted to a first RF frequency, and signal 912 may be the same analog signal up-converted to a second RF frequency. A low noise amplifier 902 has an input coupled to antenna 901 to receive the up-converted RF signals, and outputs an amplified up-converted signal on line 909. In a differential system line, 909 may be two signal lines (i.e., a differential signal). A first down-converter 904 includes a first input that is coupled to the output of LNA 902 to receive the amplified RF signal. The first down-converter includes a second input coupled to receive a signal corresponding to the first RF frequency (i.e., a frequency such as f1) from synthesizer 903. The first down-converter outputs a baseband analog signal. The analog signal corresponds to the analog signal carrying information across frequency range 915, which was provided to an up-converter in the transmitter that generated signal 910. A second down-converter 905 includes an input that is coupled to the output of LNA 902 to receive the amplified up-converted signal. The second down-converter 905 includes an input that is coupled to a signal corresponding to the second RF frequency (f2) from synthesizer 903. The second down-converter also outputs a baseband analog signal. The analog signal from down-converter 905 corresponds to an analog signal carrying information across frequency range 916, which was provided to an up-converter in the transmitter that generated signal 910. As mentioned above, frequency range 915 and 916 may carry the same information and may result in the same analog signal when down-converted. A filter 906 is coupled to the output of down-converter 904 to receive the down-converted version of signal 911. Filter 906 may also be coupled to the output of down-converter 905 to receive the down-converted version of signal 912. The filter eliminates frequency content outside the frequency band of interest. As illustrated by 520, the analog signals 911 and 912 are down-converted to the same frequency. In this example, the signals are combined and then filtered. However, it is to be understood that the signals could be filter separately and then combined. In either case, the signals are combined to improve the quality of the signal being received. In this example, the signals are down-converted directly to baseband and combined. However, in other implementations the signals could be down-converted to intermediate frequencies, combined, and then down-converted to baseband. The combined filtered signal may be found at location 908 and is illustrated in graph 920. An analog-to-digital converter 907 is coupled to receive the combined signal, where the combined signal is converted to back into a digital signal. The digital signal may be processed to retrieve the original data. If the second data is the same as the first data, the system could be used to increase the reliability of the communication channel or increase the range of transmission.

Figure 10:
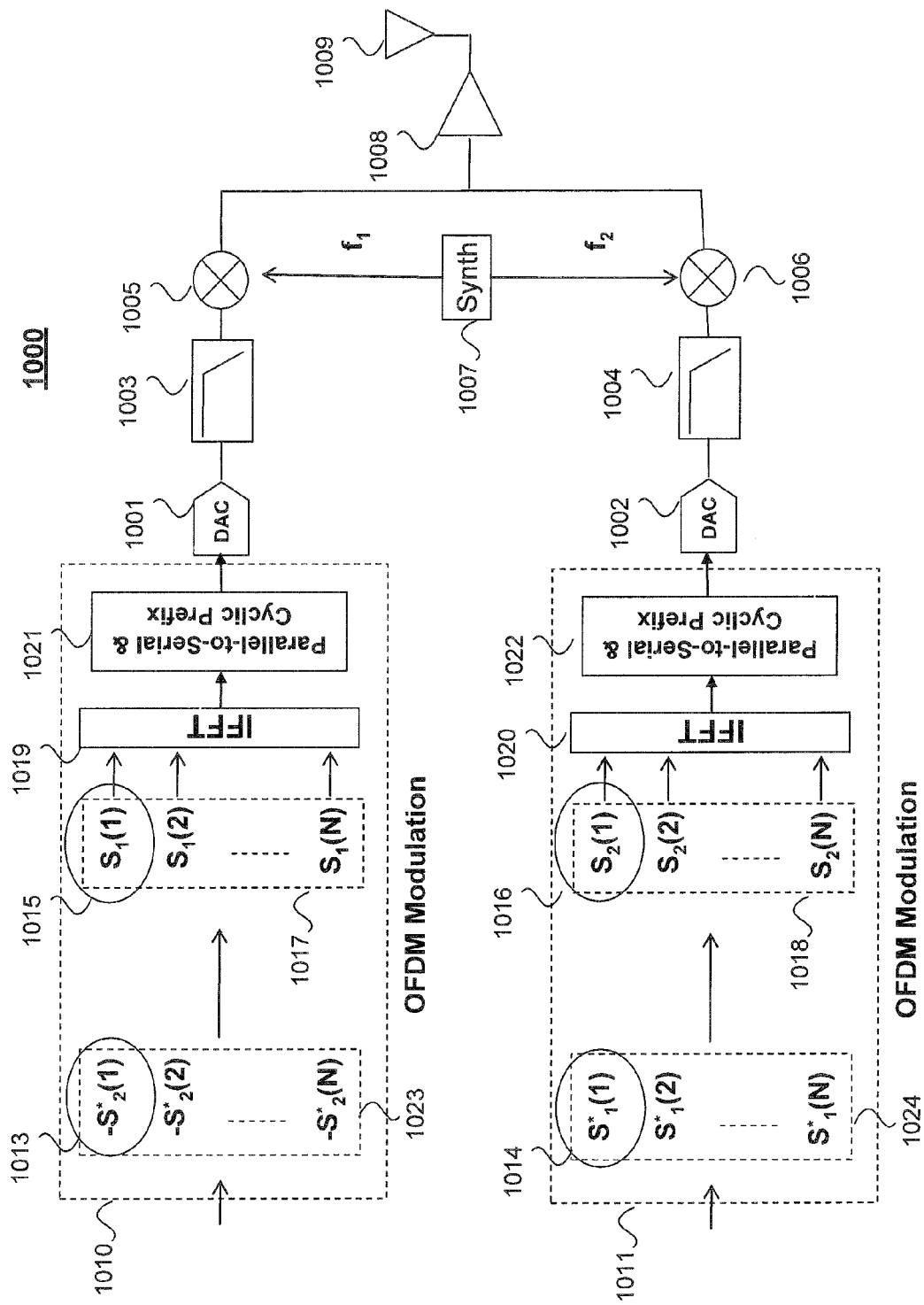
FIG. 10 illustrates a wireless communication transmitter according to one embodiment of the present invention.

FIG. 10 illustrates a wireless communication transmitter according to one embodiment of the present invention. Communication transmitter 1000 includes digital-to-analog converter (DAC) 1001, DAC 1002, filter 1003, filter 1004, up-converter 1005 (such as a mixer), up-converter 1006, synthesizer 1007, power amplifier 1008, antenna 1009, encoding block 1010, and encoding block 1011. Digital-to-analog converter (DAC) 1001, DAC 1002, filter 1003, filter 1004, up-converter 1005, up-converter 1006, synthesizer 1007, power amplifier 1008, and antenna 1009 function in a similar manner as corresponding components digital-to-analog converter (DAC) 201, DAC 202, filter 203, filter 204, up-converter 205, up-converter 206, synthesizer 207, power amplifier 208, and antenna 209 function in circuit 200 described above.

Encoding block 1010 and encoding block 1011 perform an orthogonal frequency domain multiplexing (OFDM) modulation function which utilizes an Almouti code. This example utilizes Almouti code, but other orthogonal codes may be utilized. This encoding may be done in software, firmware, or both. Elements 1013, 1014, 1015, and 1016 make up one coding matrix.

$$M1 = \begin{bmatrix} S_1(1), S_2(1) \\ -S_2^*(1), S_1^*(1) \end{bmatrix}$$

Four OFDM symbols comprised of N elements each are transmitted in a first time slot and a second time slot. The first time slot includes OFDM symbol 1017 and OFDM symbol 1018. The second time slot includes OFDM symbol 1023 and OFDM symbol 1024. OFDM symbol 1017 and 1023 are processed through an inverse fast fourier transform (IFFT) 1019 and converted to a serial bit stream with a cyclic prefix 1021. OFDM symbol 1018 and 1024 are processed through an inverse fast fourier transform (IFFT) 1020 and converted to a serial bit stream with a cyclic prefix 1022. The resulting bit streams are converted, up-converted, combined, amplified, and transmitted as described above. The symbols are transmitted over a single antenna. The frequencies $f_1$ and $f_2$ may hop to different frequencies as described above.

Figure 11:
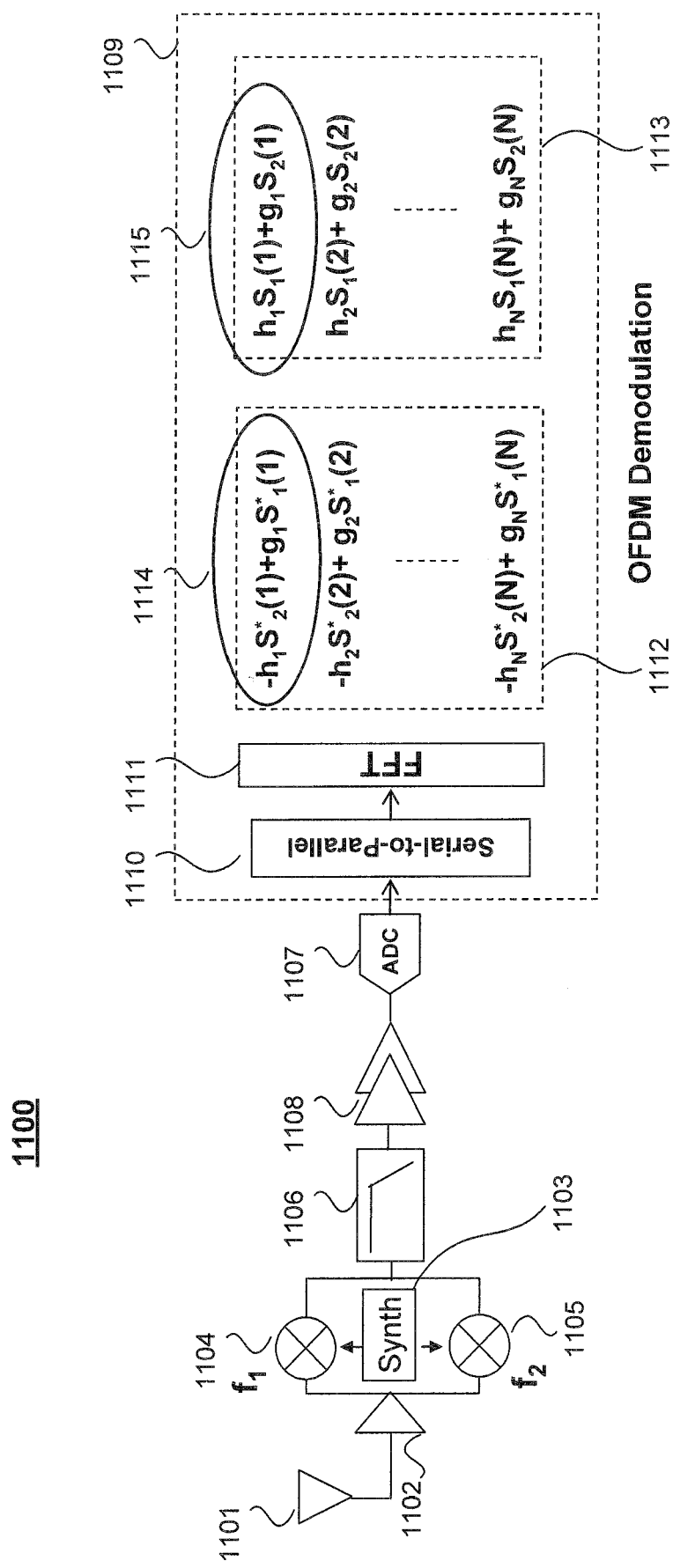
FIG. 11 illustrates a wireless communication receiver according to one embodiment of the present invention.

FIG. 11 illustrates a wireless communication receiver according to one embodiment of the present invention. Communication receiver 1100 includes antenna 1101, low noise amplifier 1102 (LNA), down-converter 1104, down-converter 1105, synthesizer 1103, filter 1106, amplifier 1108, analog-to-digital converter (ADC) 1107, and decoding block 1109. Antenna 1101, low noise amplifier 1102 (LNA), down-converter 1104, down-converter 1105, synthesizer 1103, filter 1106, and analog-to-digital converter (ADC) 1107 function in a similar manner as corresponding components antenna 901, low noise amplifier 902 (LNA), down-converter 904, down-converter 905, synthesizer 903, filter 906, and analog-to-digital converter (ADC) 907 function in circuit 900 described above. Amplifier 1108 may be an automatic gain control circuit or "AGC" added to provide additional gain prior to conversion into digital by ADC 1107. The transmitted signal is received on a single antenna and after down-conversion the signals are recombined and share the same signal path through the filter 1106, amplifier 1108, and a single ADC 1107.

Decoding block 1109 produces estimates of the information contained in the transmission. The data is converted from serial to parallel data 1110 and then the data is organized into blocks comprising "N" elements. The data is processed by a fast fourier transform (FFT) before estimating the data. This example utilizes Almouti code, but other orthogonal codes may be utilized. The purpose of the decoding is to recover $S_1$ and $S_2$ from element 1114 and element 1115. Other elements are estimated in a similar fashion. $[h_1, h_2, \ldots, h_N]$ represents the channel response over band frequency $f_1$. $[g_1, g_2, \ldots, g_N]$ represents the channel response over band frequency $f_2$. Let $Y_1$ be equal to element 1114, and let $Y_2$ be equal to element 1115.

$$Y_1 = h_1 S_1(1) + g_1 S_2(1)$$
$$Y_2 = h_1 S_2^*(1) + g_1 S_1^*$$

Estimates $$S_1 \cong \frac{h_1^* Y_1(1) + g_1 Y_2^*}{|h_1|^2 + |g_1|^2}$$

$$S_2 \cong \frac{g_1^* Y_1(1) - h_1 Y_2^*}{|h_1|^2 + |g_1|^2}$$

The other elements may be estimated in a similar fashion.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. For example, while one or more embodiments may have been described as having "an input" or "an output", it is to be understood that this term includes single-ended inputs, differential inputs, or even quadrature inputs. As another example, it is to be understood that the synthesizer used to generate different up/down conversion frequencies may be implemented as a single block or as multiple distinct blocks. Based on the above disclosure and the following claims, other arrangements, embodiments, implementations and equivalents will be evident to those skilled in the art and may be employed without departing from the spirit and scope of the invention as defined by the claims.

What is claimed is:

1. A method of transmitting information in a wireless communication channel comprising:
   transmitting first information across a first frequency range using a wireless transmitter, the first frequency range having a first center frequency, a first highest frequency, and a first lowest frequency; and
   simultaneously transmitting second information across a second frequency range using the same wireless transmitter, the second frequency range having a second center frequency greater than the first center frequency, a second highest frequency, and a second lowest frequency.

2. The method of claim 1 wherein frequency difference between the first center frequency and the second center frequency is greater than the sum of one-half the first frequency range and one-half the second frequency range.

3. The method of claim 1 wherein the first and second information are transmitted using the same power amplifier in said wireless transmitter.

4. The method of claim 3 wherein the bandwidth of said power amplifier is greater than the difference between the first lowest frequency and the second highest frequency.

5. The method of claim 1 further comprising concurrently changing the first center frequency to a third center frequency and the second center frequency to a fourth center frequency, wherein the fourth center frequency is greater than the third center frequency, and wherein the first center frequency changes by at least the first frequency range and the second center frequency changes by at least the second frequency range, and wherein the bandwidth of said power amplifier is greater than the difference between the first lowest frequency and the second highest frequency for the changed first and second center frequencies.

6. The method of claim 1 wherein the first information corresponds to a first wireless protocol and the second information corresponds to a second wireless protocol.

7. The method of claim 1 wherein the first information and the second information are the same data transmitted across two different frequencies.

8. The method of claim 1 wherein the first information and the second information are from the same data stream.

9. The method of claim 1 wherein first information and second information comprise a plurality of OFDM symbols, wherein a first symbol is transmitted during a first time slot across the first frequency range and a second symbol is transmitted during the first time slot across the second frequency range, and wherein a third symbol is transmitted during a second time slot across the first frequency range and a fourth symbol is transmitted during the second time slot across a second frequency range.

10. A method of transmitting information in a wireless communication channel comprising:
    receiving a first digital signal comprising first data to be transmitted;
    receiving a second digital signal comprising second data to be transmitted;
    converting the first digital signal into a first analog signal using a first digital-to-analog converter, the first analog signal carrying the first data across a first frequency range;
    converting the second digital signal into a second analog signal using a second digital-to-analog converter, the second analog signal carrying the second data across a second frequency range;
    up-converting the first analog signal to a first RF center frequency to produce a first up-converted analog signal, wherein the first up-converted analog signal comprises a first up-converted frequency range from the first RF center frequency minus one-half the first frequency range to the first RF center frequency plus one-half the first frequency range;
    up-converting the second analog signal to a second RF center frequency greater than the first center RF frequency to produce a second up-converted analog signal, wherein the second up-converted analog signal comprises a second up-converted frequency range from the second RF center frequency minus one-half the second frequency range to the second RF center frequency plus one-half the second frequency range, and wherein a frequency difference between the first RF center frequency and the second RF center frequency is greater than the sum of one-half the first frequency range and one-half the second frequency range;

combining the first up-converted analog signal and the second up-converted analog signal to produce a combined up-converted signal;

amplifying the combined up-converted signal in a power amplifier resulting in an amplified combined up-converted signal; and transmitting the amplified combined up-converted signal on a first antenna, wherein the bandwidth of said power amplifier is greater than the difference between a lowest frequency in the first up-converted frequency range and a highest frequency in the second up-converted frequency range.

11. The method of claim 10 further comprising changing the first and second RF center frequencies, and in accordance therewith, up-converting the first analog signals to the changed first and second RF center frequencies, wherein the first RF center frequency changes by at least the first frequency range and the second RF center frequency changes by at least the second frequency range.

12. The method of claim 11 wherein the first and second RF center frequencies are changed concurrently.

13. The method of claim 10 wherein the first digital signal is encoded using a first wireless protocol and the second digital signal is encoded using a second wireless protocol.

14. The method of claim 10 wherein the second data is the same as the first data, the method further comprising:

receiving the transmitted signal on a second antenna;

amplifying the received signal in a low noise amplifier resulting in an amplified received up-converted signal, wherein the bandwidth of said low noise amplifier is greater than the difference between the lowest frequency in the first up-converted frequency range and the highest frequency in the second up-converted frequency range;

down-converting the amplified received up-converted signal using a first down-converter and a signal corresponding to the first RF center frequency to produce a fourth analog signal corresponding to the first analog signal; and down-converting the amplified received up-converted analog signal using a second down-converter and a signal corresponding to the second RF center frequency to produce a fifth analog signal corresponding to the second analog signal.

15. The method of claim 12 further comprising:

filtering the fourth analog signal using a third filter and filtering the fifth analog signal using a fourth filter; and converting the filtered fourth analog signal into a third digital signal using a first analog-to-digital converter and converting the filtered fifth analog signal into a fourth digital signal using a second analog-to-digital converter; and combining the third and fourth digital signals to receive data corresponding to the first data.

16. The method of claim 12 further comprising:

combining the fourth and fifth analog signals resulting in a sixth signal; and converting the sixth signal into a third digital signal using a first analog-to-digital converter, and in accordance therewith, receiving data corresponding to the first data.

17. A wireless communication system comprising:

a baseband digital system for providing a first digital signal comprising a first data to be transmitted and a second digital signal comprising a second data to be transmitted;

a first digital-to-analog converter for receiving the first digital signal and converting the first digital signal into a first analog signal, the first analog signal carrying the first data across a first frequency range;

a second digital-to-analog converter for receiving the second digital signal and converting the second digital signal into a second analog signal, the second analog signal carrying the second data across a second frequency range;

a first up-converter circuit having a first input coupled to receive the first analog signal and a second input coupled to receive a first modulation signal having a first RF frequency, wherein the first up-converter outputs a first up-converted analog signal comprising a first up-converted frequency range from the first RF frequency minus one-half the first frequency range to the first RF frequency plus one-half the first frequency range;

a second up-converter circuit having a first input coupled to receive the second analog signal and a second input coupled to receive a second modulation signal having a second RF frequency, wherein the second up-converter outputs a second up-converted analog signal comprising a second up-converted frequency range from the second RF frequency minus one-half the second frequency range to the second RF frequency plus one-half the second frequency range, and wherein frequency difference between the first RF frequency and the second RF frequency is greater than the sum of one-half the first frequency range and one-half the second frequency range; and a power amplifier coupled to receive the first and second up-converted analog signals, wherein the bandwidth of the power amplifier is greater than the difference between a lowest frequency in the first up-converted frequency range and a highest frequency in the second up-converted frequency range.

18. The communication system of claim 17 wherein the first RF frequency and the second RF frequency change within the bandwidth of the power amplifier.

19. The communication system of claim 18 wherein the first RF frequency and the second RF frequency change concurrently.

20. The communication system of claim 18 wherein the first RF frequency and the second RF frequency change periodically.

21. The communication system of claim 17 wherein the first data of the first digital signal is encoded using a first wireless protocol and the first data of the second digital signal is encoded using a second wireless protocol.

22. The communication system of claim 17 wherein the second data corresponds to the first data and wherein the power amplifier outputs a third up-converted signal comprising the up-converted first analog signal and the up-converted second analog signal.

23. The communication system of claim 17 wherein first and second data to be transmitted comprise a plurality of OFDM symbols, wherein a first symbol is transmitted during a first time slot across the first up-converted frequency range and a second symbol is transmitted during the first time slot across the second up-converted frequency range, and wherein a third symbol is transmitted during a second time slot across the first up-converted frequency range and a fourth symbol is transmitted during the second time slot across a second up-converted frequency range.

24. An electronic circuit comprising:
- a first down-converter circuit having a first input coupled to receive a first up-converted signal, a second input coupled to receive a first demodulation signal having a first RF frequency, and an output, wherein the first down-converter circuit outputs a first down-converted signal on the first down-converter output;
- a second down-converter circuit having a first input coupled to receive the first up-converted signal, a second input coupled to receive a second demodulation signal having a second RF frequency different than the first RF frequency, and an output, wherein the second down-converter outputs a second down-converted signal on the second down-converter output, wherein the first up-converted signal comprises a first signal modulated at the first RF frequency and a second signal modulated at the second RF frequency; and
- a filter having an input coupled to the output of the first down-converter and the output of the second down-converter, and in accordance therewith, the filter receives the first and second down-converted signals.

25. The communication system of claim 24 wherein first signal has a first frequency range and the second signal has a second frequency range, and wherein the frequency difference between the first RF frequency and the second RF frequency is greater than the sum of one-half the first frequency range and one-half the second frequency range.

* * * * *